United States Patent
Kim et al.

(10) Patent No.: US 10,528,867 B1
(45) Date of Patent: Jan. 7, 2020

(54) LEARNING METHOD AND LEARNING DEVICE FOR NEURAL NETWORK AT ADAPTIVE LEARNING RATE, AND TESTING METHOD AND TESTING DEVICE USING THE SAME

(71) Applicant: StradVision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/154,060

(22) Filed: Oct. 8, 2018

(51) Int. Cl.
  *G06N 3/08* (2006.01)
  *G06N 3/04* (2006.01)
(52) U.S. Cl.
  CPC ........... *G06N 3/084* (2013.01); *G06N 3/0472* (2013.01); *G06N 3/088* (2013.01)

(58) Field of Classification Search
  None
  See application file for complete search history.

(56) References Cited

U.S. PATENT DOCUMENTS

| | | | | |
|---|---|---|---|---|
| 5,715,372 A | * | 2/1998 | Meyers | ................... G10L 15/02 704/200 |
| 2018/0029900 A1 | * | 2/2018 | Han | ........................ C02F 1/008 |

OTHER PUBLICATIONS

Takase et al., Effective Neural Network Training with Adaptive Learning Rate Based on Training Loss, (Feb. 2018), Neural Networks vol. 101 at p. 68-78 (Year: 2018).*
Girshick, Fast R-CNN (2015) available from Internet at p. 1-9 https://arxiv.org/pdf/1504.08083.pdf (Year: 2015).*
Yang, Discriminant Analysis by Neural Networks (2006), Handbook of Vibrational Spectroscopy at 2094-2106 (Year: 2006).*

* cited by examiner

*Primary Examiner* — Alan Chen
(74) *Attorney, Agent, or Firm* — Husch Blackwell LLP

(57) ABSTRACT

A method for learning a neural network by adjusting a learning rate each time when an accumulated number of iterations reaches one of a first to an n-th specific values. The method includes steps of: (a) a learning device, while increasing k from 1 to (n−1), (b1) performing a k-th learning process of repeating the learning of the neural network at a k-th learning rate by using a part of the training data while the accumulated number of iterations is greater than a (k−1)-th specific value and is equal to or less than a k-th specific value, (b2) changing a k-th gamma to a (k+1)-th gamma by referring to k-th losses of the neural network which are obtained by the k-th learning process and (ii) changing a k-th learning rate to a (k+1)-th learning rate by using the (k+1)-th gamma.

20 Claims, 8 Drawing Sheets

LEARNING METHOD AND LEARNING DEVICE FOR NEURAL NETWORK AT ADAPTIVE LEARNING RATE, AND TESTING METHOD AND TESTING DEVICE USING THE SAME

FIELD OF THE INVENTION

The present invention relates to a method for learning a neural network by adjusting a learning rate each time when an accumulated number of iterations reaches one of a first to an n-th specific values; and more particularly to, the method for learning the neural network by adjusting the learning rate each time when the accumulated number of iterations reaches one of the first to the n-th specific values, including steps of: (a) assuming that a first gamma, which is a constant used for adjusting a change rate of the learning rate, has been predetermined, (i) performing a first learning process of repeating the learning of the neural network at a predetermined first learning rate by using a part of training data while the accumulated number of iterations is equal to or less than the first specific value and (ii) changing the first gamma to a second gamma by referring to first losses of the neural network which are obtained by the first learning process; and (b) while increasing k from 2 to (n−1), (b1) performing a k-th learning process of repeating the learning of the neural network at a k-th learning rate by using a part of the training data while the accumulated number of iterations is greater than a (k−1)-th specific value and is equal to or less than a k-th specific value, (b2) (i) changing a k-th gamma to a (k+1)-th gamma by referring to k-th losses of the neural network which are obtained by the k-th learning process and (ii) changing a k-th learning rate to a (k+1)-th learning rate by using the (k+1)-th gamma, and (b3) performing a (k+1)-th learning process of repeating the learning of the neural network at the (k+1)-th learning rate by using a part of the training data while the accumulated number of iterations is greater than the k-th specific value and is equal to or less than a (k+1)-th specific value, and a learning device, a testing method and a testing device using the same.

BACKGROUND OF THE INVENTION

Recently, a method of recognizing an object using machine learning techniques has been studied. As one of these machine learning techniques, a deep learning technique, which uses a neural network with several hidden layers between its input layer and its output layer, has a high recognizing performance.

And, the neural network using the deep learning technique is generally learned through backpropagation using one or more losses.

However, upon learning by backpropagation, as a learning rate, i.e., a ratio of reflecting the losses on one or more parameters of the neural network, gets smaller, the learning becomes more sophisticated, but it takes a long time in learning the neural network.

Hence, according to the conventional art, the neural network is learned in such a manner that reduces the learning rate by a certain amount after a certain number of iterative learning. That is, in an initial stage of the learning, the learning rate is set as high and thus the fluctuation range of the parameters may be increased, resulting in a fast learning. Thereafter, the learning rate is decreased stepwise and thus the fluctuation range of the parameters may be reduced, resulting in allowing the parameters to be adjusted minutely.

A method of learning the neural network according to the conventional art will be described as follows by referring to FIGS. 1A and 1B.

First of all, initial constant values for the learning rate of the neural network are set.

Herein, the initial constant values may include (i) a base learning rate (lr) which is an initial learning rate, (ii) a step which is an iteration unit for changing the learning rate, and (iii) a gamma which is a value for adjusting a change rate of the learning rate. Herein, the iteration may be the number of repetitions of the learning by using one batch data.

Then, the learning rate can be expressed as the following equation 1.

$$\text{current\_lr} = \text{base\_lr} \times \text{gamma}^{\left(\frac{\text{current\_iter}}{\text{step}}\right)} \qquad \text{[Equation 1]}$$

FIG. 1A shows a state in which the learning rate is changed when the base learning rate (lr) is set to 0.01, the step is set to 100,000, and the gamma is set to 0.1, and FIG. 1B shows a state in which a loss is changed when the neural network is learned by using the changed learning rate in FIG. 1A.

Referring to FIG. 1A, the neural network is learned through backpropagation by referring to each loss for each iteration by using the learning rate of 0.01 as the base learning rate, from the beginning to 100,000-th iterations. Then, when the accumulated number of iterations reaches 100,000, the learning rate is changed to 0.001 according to Equation 1, and the learning is performed until 200,000-th iteration. Also, when the accumulated number of iterations reaches 200,000, the learning rate is changed to 0.0001 according to Equation 1, and the learning is performed until 300,000-th iteration. Then, the learning process is repeated in the same manner.

However, as can be seen from FIG. 1B, the conventional learning method reduces the learning rate at a fixed rate regardless of the loss, and thus experiments should be performed several times in order to find optimal values of the step and the gamma.

Also, even when the optimum values of the step and the gamma are found, if the learning data is changed or the structure of the neural network is changed, there is a problem that the optimum values of the step and the gamma need to be found again.

In addition, in order to find the optimum values of the step and the gamma, it takes much time and effort to learn the neural network with the optimal values.

SUMMARY OF THE INVENTION

It is an object of the present invention to solve all the aforementioned problems.

It is another object of the present invention to optimize a learning rate by reflecting a learning situation.

It is still another object of the present invention to optimize the learning rate through one learning procedure by adjusting the learning rate by referring to losses.

It is still yet another object of the present invention to adjust a gamma which is a constant used for adjusting the change rate of the learning rate by referring to a loss gradient, and optimize the learning rate by adjusting the learning rate by using the adjusted gamma.

In accordance with one aspect of the present invention, there is provided a method for learning a neural network by adjusting a learning rate each time when an accumulated number of iterations reaches one of a first to an n-th specific values, including steps of: (a) a learning device, assuming that a first gamma, which is a constant used for adjusting a change rate of the learning rate, has been predetermined, (i) performing a first learning process of repeating the learning of the neural network at a predetermined first learning rate by using a part of training data while the accumulated number of iterations is equal to or less than the first specific value and (ii) changing the first gamma to a second gamma by referring to first losses of the neural network which are obtained by the first learning process; and (b) the learning device, while increasing k from 2 to (n−1), (b1) performing a k-th learning process of repeating the learning of the neural network at a k-th learning rate by using a part of the training data while the accumulated number of iterations is greater than a (k−1)-th specific value and is equal to or less than a k-th specific value, (b2) (i) changing a k-th gamma to a (k+1)-th gamma by referring to k-th losses of the neural network which are obtained by the k-th learning process and (ii) changing a k-th learning rate to a (k+1)-th learning rate by using the (k+1)-th gamma, and (b3) performing a (k+1)-th learning process of repeating the learning of the neural network at the (k+1)-th learning rate by using a part of the training data while the accumulated number of iterations is greater than the k-th specific value and is equal to or less than a (k+1)-th specific value.

As one example, at the step of (b), the learning device changes the k-th gamma to the (k+1)-th gamma by referring to a k-th loss gradient that is generated by referring to (i) the k-th losses and (ii) (k−1)-th losses of the neural network which are obtained by a (k−1)-th learning process of repeating the learning of the neural network by using a part of the training data while the accumulated number of iterations is greater than a (k−2)-th specific value and is equal to or less than the (k−1)-th specific value.

As one example, if the k-th loss gradient is equal to or greater than a predetermined minimum loss gradient, the learning device determines the (k+1)-th gamma by referring to a result generated by multiplying the k-th gamma by the k-th loss gradient.

As one example, if the k-th loss gradient is less than the predetermined minimum loss gradient, the (k+1)-th gamma is determined as the k-th gamma.

As one example, the learning device determines the k-th loss gradient to be a ratio of a sum of the k-th losses to a sum of the (k−1)-th losses.

As one example, at the step of (b), the learning device determines the (k+1)-th learning rate to be a result that is generated by multiplying the k-th learning rate by the (k+1)-h gamma.

As one example, each of the parts of the training data is batch data, wherein the number of the batch data used while the accumulated number of iterations is equal to or less than the first specific value is determined as the number of iterations during the first learning process, and wherein the number of the batch data used while the accumulated number of iterations is greater than the k-th specific value and is equal to or less than a (k+1)-th specific value is determined as the number of iterations during the (k+1)-th learning process.

As one example, the number of the batch data used while the accumulated number of iterations is equal to or less than the first specific value is equal to the number of the batch data used while the accumulated number of iterations is greater than the k-th specific value and is equal to or less than a (k+1)-th specific value.

As one example, wherein the neural network includes (i) at least one convolution layer capable of applying at least one convolution operation to the training data to thereby output at least one feature map, (ii) at least one fully connected (FC) layer capable of applying at least one FC operation to at least one feature vector generated by pooling an area corresponding to a region of interest (ROI) on the feature map to thereby output probability values corresponding to at least one object included in the training data, and (iii) an output layer capable of outputting at least one class score and at least one regression delta corresponding to the probability values outputted from the FC layer, wherein, if the learning device learns the FC layer and the convolution layer through backpropagation by using a loss calculated by referring to at least one output of the output layer and its corresponding ground truth (GT), the learning device determines a variation range of at least one parameter of the FC layer and the convolution layer by referring to the first learning rate to the k-th learning rate.

As one example, on condition that (i) each of the parts of the training data is batch data, (ii) the number of the batch data used while the accumulated number of iterations is equal to or less than the first specific value is determined as the number of iterations during the first learning process and (iii) the number of the batch data used while the accumulated number of iterations is greater than the k-th specific value and is equal to or less than a (k+1)-th specific value is determined as the number of iterations during the (k+1)-th learning process, the learning device learns the FC layer and the convolution layer through backpropagation by using a loss calculated by referring to each of at least one output of the output layer corresponding to each of the batch data and its corresponding GT.

In accordance with another aspect of the present invention, there is provided a method for testing a neural network having been learned by adjusting a learning rate each time when an accumulated number of iterations reaches one of a first to an n-th specific values, including steps of: (a) on condition that, (I) assuming that a first gamma, which is a constant used for adjusting a change rate of the learning rate, has been predetermined, a learning device (i) has performed a first learning process of repeating the learning of the neural network at a predetermined first learning rate by using a part of training data while the accumulated number of iterations is equal to or less than the first specific value and (ii) has changed the first gamma to a second gamma by referring to first losses of the neural network, which are obtained by the first learning process; and (II) the learning device, while increasing k from 2 to (n−1), (i) has performed a k-th learning process of repeating the learning of the neural network at a k-th learning rate by using a part of the training data while the accumulated number of iterations is greater than a (k−1)-th specific value and is equal to or less than a k-th specific value, (ii) (ii-1) has changed a k-th gamma to a (k+1)-th gamma by referring to k-th losses of the neural network, which are obtained by the k-th learning process and (ii-2) has changed a k-th learning rate to a (k+1)-th learning rate by using the (k+1)-th gamma, and (iii) has performed a (k+1)-th learning process of repeating the learning of the neural network at the (k+1)-th learning rate by using a part of the training data while the accumulated number of iterations is greater than the k-th specific value and is equal to or less than a (k+1)-th specific value, a testing device inputting testing data to the neural network; and (b) the testing device instructing the neural network to output a result of operating the testing data by using at least one parameter learned at the first learning rate to the (k+1)-th learning rate.

As one example, at the process of (II), the learning device has changed the k-th gamma to the (k+1)-th gamma by referring to a k-th loss gradient generated by referring to (i) the k-th losses and (ii) (k−1)-th losses of the neural network obtained by a (k−1)-th learning process of repeating the learning of the neural network by using a part of the training data while the accumulated number of iterations is greater than a (k−2)-th specific value and is equal to or less than the (k−1)-th specific value.

As one example, if the k-th loss gradient is equal to or greater than a predetermined minimum loss gradient, the learning device has determined the (k+1)-th gamma by referring to a result generated by multiplying the k-th gamma by the k-th loss gradient.

As one example, the neural network includes (i) at least one convolution layer capable of applying at least one convolution operation to the training data to thereby output at least one feature map, (ii) at least one fully connected (FC) layer capable of applying at least one FC operation to at least one feature vector generated by pooling an area corresponding to a region of interest (ROI) on the feature map to thereby output probability values corresponding to at least one object included in the training data, and (iii) an output layer capable of outputting at least one class score and at least one regression delta corresponding to the probability values outputted from the FC layer, wherein, upon learning the FC layer and the convolution layer through backpropagation by using a loss calculated by referring to at least one output of the output layer and its corresponding ground truth (GT), the learning device has determined a variation range of at least one parameter of the FC layer and the convolution layer by referring to the first learning rate to the k-th learning rate.

As one example, on condition that (i) each of the parts of the training data is batch data, (ii) the number of the batch data used while the accumulated number of iterations is equal to or less than the first specific value is determined as the number of iterations during the first learning process and (iii) the number of the batch data used while the accumulated number of iterations is greater than the k-th specific value and is equal to or less than a (k+1)-th specific value is determined as the number of iterations during the (k+1)-th learning process, the learning device has learned the FC layer and the convolution layer through backpropagation by using a loss calculated by referring to each of at least one output of the output layer corresponding to each of the batch data and its corresponding GT.

In accordance with still another aspect of the present invention, there is provided a learning device for learning a neural network by adjusting a learning rate each time when an accumulated number of iterations reaches one of a first to an n-th specific values, including: a communication part for acquiring training data; and a processor for, (I) assuming that a first gamma, which is a constant used for adjusting a change rate of the learning rate, has been predetermined, (i) performing a first learning process of repeating the learning of the neural network at a predetermined first learning rate by using a part of the training data while the accumulated number of iterations is equal to or less than the first specific value and (ii) changing the first gamma to a second gamma by referring to first losses of the neural network which are obtained by the first learning process, and (II) while increasing k from 2 to (n−1), (II-1) performing a k-th learning process of repeating the learning of the neural network at a k-th learning rate by using a part of the training data while the accumulated number of iterations is greater than a (k−1)-th specific value and is equal to or less than a k-th specific value, (II-2) (i) changing a k-th gamma to a (k+1)-th gamma by referring to k-th losses of the neural network which are obtained by the k-th learning process and (ii) changing a k-th learning rate to a (k+1)-th learning rate by using the (k+1)-th gamma, and (II-3) performing a (k+1)-th learning process of repeating the learning of the neural network at the (k+1)-th learning rate by using a part of the training data while the accumulated number of iterations is greater than the k-th specific value and is equal to or less than a (k+1)-th specific value.

As one example, at the process of (II), the processor changes the k-th gamma to the (k+1)-th gamma by referring to a k-th loss gradient that is generated by referring to (i) the k-th losses and (ii) (k−1)-th losses of the neural network which are obtained by a (k−1)-th learning process of repeating the learning of the neural network by using a part of the training data while the accumulated number of iterations is greater than a (k−2)-th specific value and is equal to or less than the (k−1)-th specific value.

As one example, if the k-th loss gradient is equal to or greater than a predetermined minimum loss gradient, the processor determines the (k+1)-th gamma by referring to a result generated by multiplying the k-th gamma by the k-th loss gradient.

As one example, if the k-th loss gradient is less than the predetermined minimum loss gradient, the (k+1)-th gamma is determined as the k-th gamma.

As one example, the processor determines the k-th loss gradient to be a ratio of a sum of the k-th losses to a sum of the (k−1)-th losses.

As one example, at the process of (II), the processor determines the (k+1)-th learning rate to be a result that is generated by multiplying the k-th learning rate by the (k+1)-h gamma.

As one example, each of the parts of training data is batch data, wherein the number of the batch data used while the accumulated number of iterations is equal to or less than the first specific value is determined as the number of iterations during the first learning process, and wherein the number of the batch data used while the accumulated number of iterations is greater than the k-th specific value and is equal to or less than a (k+1)-th specific value is determined as the number of iterations during the (k+1)-th learning process.

As one example, the number of the batch data used while the accumulated number of iterations is equal to or less than the first specific value is equal to the number of the batch data used while the accumulated number of iterations is greater than the k-th specific value and is equal to or less than a (k+1)-th specific value.

As one example, the neural network includes (i) at least one convolution layer capable of applying at least one convolution operation to the parts of the training data to thereby output at least one feature map, (ii) at least one fully connected (FC) layer capable of applying at least one FC operation to at least one feature vector generated by pooling an area corresponding to a region of interest (ROI) on the feature map to thereby output probability values corresponding to at least one object included in the training data, and (iii) an output layer capable of outputting at least one class score and at least one regression delta corresponding to the probability values outputted from the FC layer, wherein, if the processor learns the FC layer and the convolution layer through backpropagation by using a loss calculated by referring to at least one output of the output layer and its corresponding ground truth (GT), the processor determines a variation range of at least one parameter of the FC layer and the convolution layer by referring to the first learning rate to the k-th learning rate.

As one example, on condition that (i) each of the parts of the training data is batch data, (ii) the number of the batch data used while the accumulated number of iterations is equal to or less than the first specific value is determined as the number of iterations during the first learning process and (iii) the number of the batch data used while the accumulated number of iterations is greater than the k-th specific value and is equal to or less than a (k+1)-th specific value is determined as the number of iterations during the (k+1)-th learning process, the processor learns the FC layer and the convolution layer through backpropagation by using a loss calculated by referring to each of at least one output of the output layer corresponding to each of the batch data and its corresponding GT.

In accordance with still yet another aspect of the present invention, there is provided a testing device for testing a neural network having been learned by adjusting a learning rate each time when an accumulated number of iterations reaches one of a first to an n-th specific values, including: a communication part for acquiring testing data, on condition that, (I) assuming that a first gamma, which is a constant used for adjusting a change rate of the learning rate, has been predetermined, a learning device (i) has performed a first learning process of repeating the learning of the neural network at a predetermined first learning rate by using a part of training data while the accumulated number of iterations is equal to or less than the first specific value and (ii) has changed the first gamma to a second gamma by referring to first losses of the neural network, which are obtained by the first learning process; and (II) the learning device, while increasing k from 2 to (n−1), (i) has performed a k-th learning process of repeating the learning of the neural network at a k-th learning rate by using a part of the training data while the accumulated number of iterations is greater than a (k−1)-th specific value and is equal to or less than a k-th specific value, (ii) (ii-1) has changed a k-th gamma to a (k+1)-th gamma by referring to k-th losses of the neural network, which are obtained by the k-th learning process and (ii-2) has changed a k-th learning rate to a (k+1)-th learning rate by using the (k+1)-th gamma, and (iii) has performed a (k+1)-th learning process of repeating the learning of the neural network at the (k+1)-th learning rate by using a part of the training data while the accumulated number of iterations is greater than the k-th specific value and is equal to or less than a (k+1)-th specific value; and a processor for inputting the testing data to the neural network, and instructing the neural network to output a result of operating the testing data by using at least one parameter learned at the first learning rate to the (k+1)-th learning rate.

As one example, at the process of (II), the learning device has changed the k-th gamma to the (k+1)-th gamma by referring to a k-th loss gradient generated by referring to (i) the k-th losses and (ii) (k−1)-th losses of the neural network obtained by a (k−1)-th learning process of repeating the learning of the neural network by using a part of training data while the accumulated number of iterations is greater than a (k−2)-th specific value and is equal to or less than the (k−1)-th specific value.

As one example, if the k-th loss gradient is equal to or greater than a predetermined minimum loss gradient, the learning device has determined the (k+1)-th gamma by referring to a result generated by multiplying the k-th gamma by the k-th loss gradient.

As one example, the neural network includes (i) at least one convolution layer capable of applying at least one convolution operation to the training data to thereby output at least one feature map, (ii) at least one fully connected (FC) layer capable of applying at least one FC operation to at least one feature vector generated by pooling an area corresponding to a region of interest (ROI) on the feature map to thereby output probability values corresponding to at least one object included in the training data, and (iii) an output layer capable of outputting at least one class score and at least one regression delta corresponding to the probability values outputted from the FC layer, wherein, upon learning the FC layer and the convolution layer through backpropagation by using a loss calculated by referring to at least one output of the output layer and its corresponding ground truth (GT), the learning device has determined a variation range of at least one parameter of the FC layer and the convolution layer by referring to the first learning rate to the k-th learning rate.

As one example, on condition that (i) each of the parts of training data is batch data, (ii) the number of the batch data used while the accumulated number of iterations is equal to or less than the first specific value is determined as the number of iterations during the first learning process and (iii) the number of the batch data used while the accumulated number of iterations is greater than the k-th specific value and is equal to or less than a (k+1)-th specific value is determined as the number of iterations during the (k+1)-th learning process, the learning device has learned the FC layer and the convolution layer through backpropagation by using a loss calculated by referring to each of at least one output of the output layer corresponding to each of the batch data and its corresponding GT.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1A:
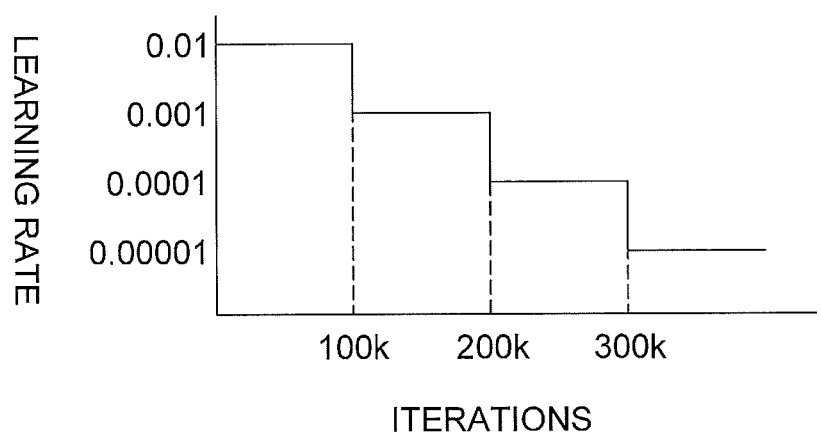
FIG. 1A is a drawing schematically illustrating a state in which a learning rate is changed according to a conventional learning method.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 2:
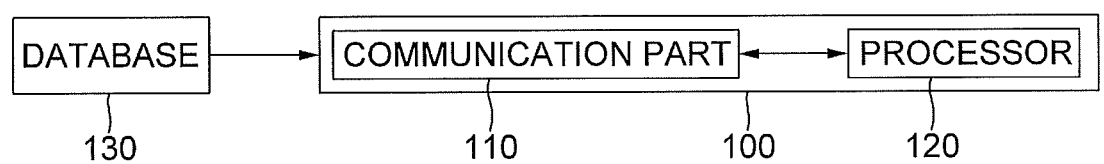
FIG. 2 is a drawing schematically illustrating a learning device capable of learning the neural network in accordance with one example embodiment of the present invention.

FIG. 2 is a drawing schematically illustrating a learning device 100 capable of learning the neural network in accordance with one example embodiment of the present invention. Referring to FIG. 2, the learning device 100 may include a communication part 110 and a processor 120.

First of all, the communication part 110 may receive training data.

Herein, the training data may have been stored in a database 130, and a part of the training data may be stored as batch data. Herein, the number of the batch data may correspond to the number of iterations, and each ground truth (GT) corresponding to each of the training data included in each of the batch data may be stored.

Thereafter, assuming that a first gamma, which is a constant used for adjusting a change rate of the learning rate, has been predetermined, the processor 120 (i) performs a first learning process of repeating the learning of the neural network at a predetermined first learning rate by using a part of training data while the accumulated number of iterations is equal to or less than the first specific value and (ii) changes the first gamma to a second gamma by referring to first losses of the neural network which are obtained by the first learning process. Further, while increasing k from 2 to (n−1), the processor 120 (I) performs a k-th learning process of repeating the learning of the neural network at a k-th learning rate by using a part of the training data while the accumulated number of iterations is greater than a (k−1)-th specific value and is equal to or less than a k-th specific value, (II) (i) changes a k-th gamma to a (k+1)-th gamma by referring to k-th losses of the neural network which are obtained by the k-th learning process and (ii) changing a k-th learning rate to a (k+1)-th learning rate by using the (k+1)-th gamma, and (III) performs a (k+1)-th learning process of repeating the learning of the neural network at the (k+1)-th learning rate by using a part of the training data while the accumulated number of iterations is greater than the k-th specific value and is equal to or less than a (k+1)-th specific value.

Herein, the processor 120 may change the k-th gamma to the (k+1)-th gamma by referring to a k-th loss gradient that is generated by referring to (i) the k-th losses and (ii) (k−1)-th losses of the neural network which are obtained by a (k−1)-th learning process of repeating the learning of the neural network by using a part of the training data while the accumulated number of iterations is greater than a (k−2)-th specific value and is equal to or less than the (k−1)-th specific value. Further, if the k-th loss gradient is equal to or greater than a predetermined minimum loss gradient, the processor 120 may determine the (k+1)-th gamma by referring to a result generated by multiplying the k-th gamma by the k-th loss gradient, and if the k-th loss gradient is less than the predetermined minimum loss gradient, the (k+1)-th gamma may be determined as the k-th gamma.

Herein, the learning device 100 in accordance with one example embodiment of the present invention is a computing device, and any device including a processor having a computation capability may be adopted as the learning device 100 in accordance with the present invention. Further, FIG. 2 illustrates only one learning device 100, but the present invention is not limited to this example. The learning device may be configured as several devices to perform its functions.

Figure 3:
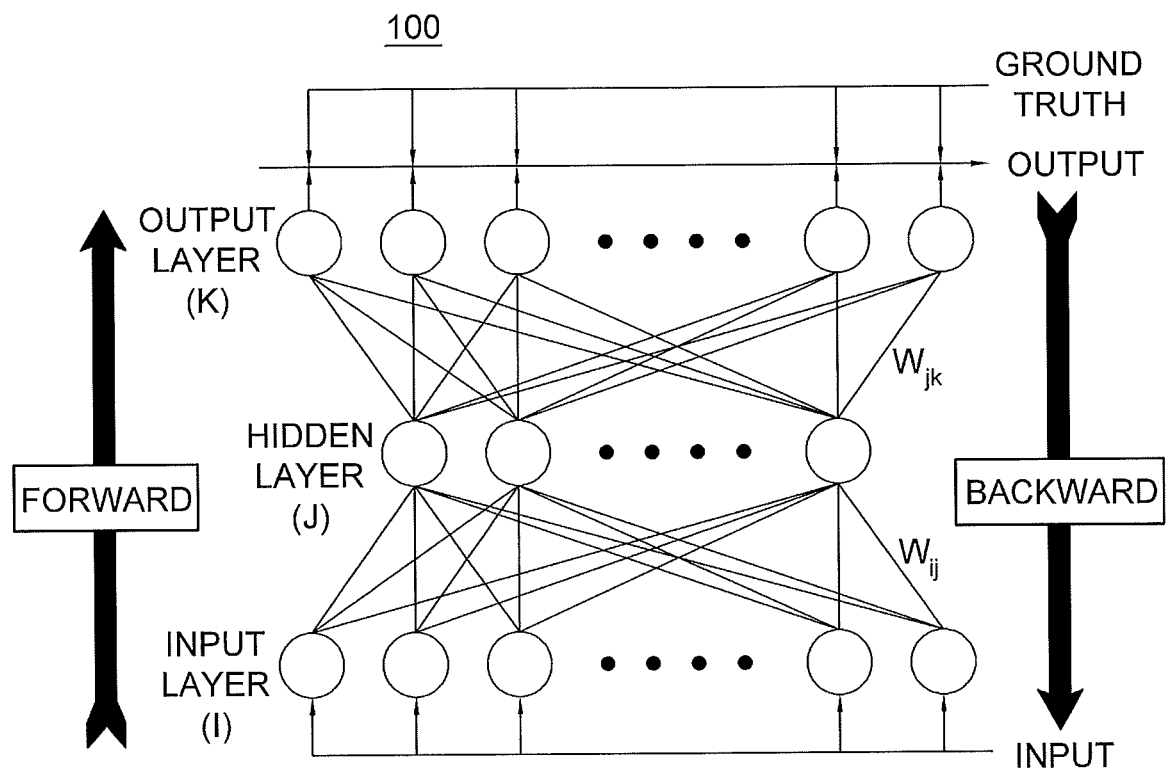
FIG. 3 is a drawing schematically illustrating a state of learning the neural network in accordance with one example embodiment of the present invention.

The method for learning the neural network by using the learning device 100 in accordance with one example embodiment of the present invention will be described as follows by referring to FIG. 3.

First of all, if the learning device 100 inputs a part of the training data to an input layer I of the neural network by a forward process, a weight $W_{ij}$ is applied to a value calculated by the input layer I and then a weighted value, i.e., a first value, is fed into a hidden layer J. Thereafter, if at least one predetermined operations by the hidden layer J are applied to the first value fed into the hidden layer J, the learning device 100 then applies a weight $W_{jk}$ to a value outputted from the hidden layer J and then a weighted value, i.e., a second value, is fed into an output layer K. Thereafter, if the output layer K applies at least one predetermined operation to the second value fed into the output layer K, the learning device 100 acquires a result outputted from the output layer K.

Herein, the hidden layer J is illustrated as one layer, but the present invention is not limited to this example. The hidden layer J may be comprised of a plurality of layers. Further, initial values may be set in advance for each of weights $W_{ij}$ and $W_{jk}$.

Thereafter, the learning device 100 obtains a loss by referring to an output of the neural network, i.e., the result outputted from the output layer K, and its corresponding ground truth (GT).

Further, the learning device 100 learns the neural network through backpropagation by using the obtained loss.

Herein, the learning process is performed to adjust weights, i.e., connection strengths of synopses that connect respective layers of the neural network, resulting in a reduction of the loss.

For example, when performing the backpropagation by using a stochastic gradient descent (SGD), each weight may be adjusted by Equation 2 below.

$$\Delta w_{ij}(t+1) = \Delta w_{ij}(t) + lr\frac{\partial C}{\partial w_{ij}} \quad \text{[Equation 2]}$$

In equation 2, lr denotes a learning rate, and C denotes a cost function.

Herein, the cost function may be determined by factors including an activation function and learning types such as a supervised learning, an unsupervised learning, and a reinforcement learning.

For example, when the supervised learning is applied to a multiclass classification problem, the activation function and the cost function are generally determined as a softmax function and a cross entropy function, respectively.

The softmax function may be expressed as Equation 3, and the cost function may be expressed as Equation 4.

$$p_j = \frac{\exp(x_j)}{\sum_k \exp(x_k)} \quad \text{[Equation 3]}$$

$$C = -\sum_j d_j \log(p_j) \quad \text{[Equation 4]}$$

In Equation 3, $p_j$ denotes a class probability, $x_j$ denotes a total input fed into a unit j, and $x_k$ denotes a total input fed into a unit k.

Further, in Equation 4, $d_j$ denotes a target probability for the unit j, and $p_j$ denotes a probability output for the unit j after applying the activation function.

The stochastic gradient descent (SGD) was described as an example of backpropagation by using the loss, but the present invention is not limited to this example. The backpropagation for learning the neural network may be performed by using a momentum scheme, Nesterov accelerated gradient (NAG) scheme, Adagrad (adaptive gradient) scheme, RMSProp scheme, AdaDelta (adaptive delta) scheme, Adam (adaptive moment estimation) scheme, etc.

A forward process, a backward process, and a process of updating weights may be defined as one iteration. Further, each of the part of the training data may be batch data, and the number of batch data may be generated to correspond to the number of iterations.

Further, the learning device 100 learns the neural network by adjusting the learning rate each time when the accumulated number of iterations reaches one of specific values.

The specific values may be set in advance according to iteration units for adjusting the learning rate, and assuming that a "step" represents the iteration unit, the learning rate may be adjusted each time when the accumulated number of iterations reaches one of numbers set as the "step" or one of multiplies of the "step". For example, if the step is set as 10,000, multiples of 10,000 may be set as a first to an n-th specific values, and n×10,000 iterations may be performed during one learning process of the neural network. However, the present invention is not limited to this example. In other examples, the step may not be a fixed number or the multiplies of the step may not be adopted.

Hereinafter, the process that the learning device 100 learns the neutral network by adjusting the learning rate each time when the accumulated number of iterations reaches one of the specific values will be described in more detail.

Assuming that a first gamma, which is a constant used for adjusting a change rate of the learning rate, has been predetermined, the learning device 100 (i) performs a first learning process of repeating the learning of the neural network at a predetermined first learning rate by using a part of training data while the accumulated number of iterations is equal to or less than the first specific value and (ii) changes the first gamma to a second gamma by referring to first losses of the neural network which are obtained by the first learning process.

Herein, the number of batch data may be determined as the number of iterations during the first learning process. The method of changing the first gamma to the second gamma by referring to first losses and the method of changing the first learning rate to the second learning rate by using the second gamma will be described below.

Thereafter, while increasing k from 2 to (n−1), the learning device 100 (I) performs a k-th learning process of repeating the learning of the neural network at a k-th learning rate by using a part of the training data while the accumulated number of iterations is greater than a (k−1)-th specific value and is equal to or less than a k-th specific value, and (II) (i) changes a k-th gamma to a (k+1)-th gamma by referring to k-th losses of the neural network which are obtained by the k-th learning process and (ii) changes a k-th learning rate to a (k+1)-th learning rate by using the (k+1)-th gamma.

Herein, the learning device 100 changes the k-th gamma to the (k+1)-th gamma by referring to a k-th loss gradient that is generated by referring to (i) the k-th losses and (ii) (k−1)-th losses. Herein, the (k−1)-th losses has been obtained by a (k−1)-th learning process of repeating the learning of the neural network by using a part of the training data while the accumulated number of iterations is greater than a (k−2)-th specific value and is equal to or less than the (k−1)-th specific value.

Namely, the learning device 100 calculates a sum of the (k−1)-th losses by using Equation 5 below and calculates a sum of the k-th losses by using Equation 6 below.

$$\text{loss\_sum1} = \sum_{n=current\_iter-step\times2}^{current\_iter-step} \text{loss}_n \quad \text{[Equation 5]}$$

$$\text{loss\_sum2} = \sum_{n=current\_iter-step}^{current\_iter} \text{loss}_n \quad \text{[Equation 6]}$$

Further, the learning device 100 determines the k-th loss gradient to be a ratio of the sum of the k-th losses to the sum of the (k−1)-th losses by using Equation 7 below.

$$\text{loss\_gradient} = \frac{\text{loss\_sum2}}{\text{loss\_sum1}} \quad \text{[Equation 7]}$$

Thereafter, if the k-th loss gradient is equal to or greater than a predetermined minimum loss gradient, the learning device 100 updates the k-th gamma as the (k+1)-th gamma.

Herein, the (k+1)-th gamma is determined as a result generated by multiplying the k-th gamma by the k-th loss gradient by using Equation 8 below. However, if the k-th loss gradient is less than the predetermined minimum loss gradient, the (k+1)-th gamma is determined as the k-th gamma.

$$\text{gamma}(n) = \text{loss\_gradient} \times \text{gamma}(n-1) \quad \text{[Equation 8]}$$

Herein, if the learning rate is decreased each time when the accumulated number of iterations reaches one of the specific values, the learning of the neural network is quickly finished, and thus the learning may not be sufficiently performed. As such, the learning rate may be set to be decreased only when the loss gradient becomes equal to or greater than a predetermined value, e.g., the minimum loss gradient.

Further, the learning device 100 determines the (k+1)-th learning rate as a result of multiplying the k-th learning rate by the (k+1)-h gamma by using Equation 9 below.

$$lr(n) = lr(n-1) \times \text{gamma}(n) \quad \text{[Equation 9]}$$

Thereafter, the learning device 100 performs a (k+1)-th learning process of repeating the learning of the neural network at the (k+1)-th learning rate by using a part of the training data while the accumulated number of iterations is greater than the k-th specific value and is equal to or less than a (k+1)-th specific value. Herein, the number of batch data may be determined as the number of iterations during the (k+1)-th learning process. Also, the number of batch data used during the first learning process is equal to the number of batch data used during the (k+1)-th learning process.

Hereinafter, the method for learning the neural network in accordance with one example embodiment of the present invention will be described by referring to FIGS. 4A and 4B.

Figure 4A:
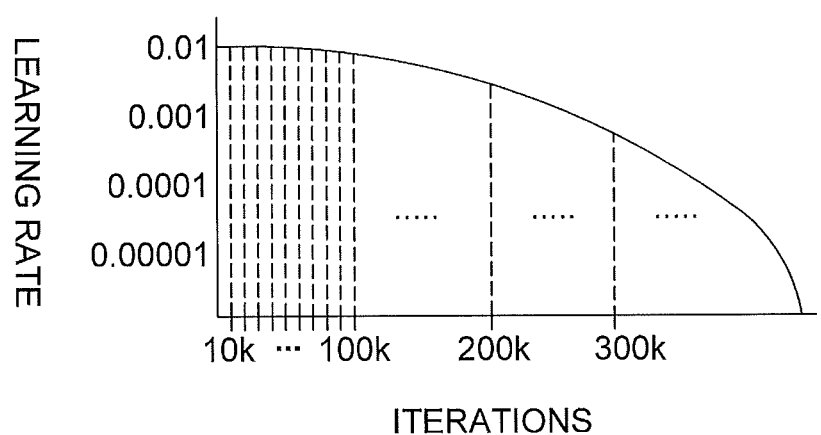
FIG. 4A is a drawing schematically illustrating a variation state of a learning rate in accordance with one example embodiment of the present invention.

FIG. 4A is a drawing schematically illustrating a variation state of the learning rate in accordance with one example embodiment of the present invention. Herein, for example, the base learning rate (lr) which is an initial learning rate may be set to 0.0, the step which is as an iteration unit for changing the learning rate may be set to 10,000, and the gamma which is a constant value for adjusting the learning rate change rate may be set to 0.9, as initial constant values. Herein, the step is set to a value smaller than 100,000 used in FIG. 1A, and the gamma is set to a value greater than 0.1 used in FIG. 1A, in order to frequently reduce the learning rate little by little according to the loss(es).

Hence, in the present invention, the learning rate is continuously changed unlike the convention learning method like FIG. 1.

Figure 1B:
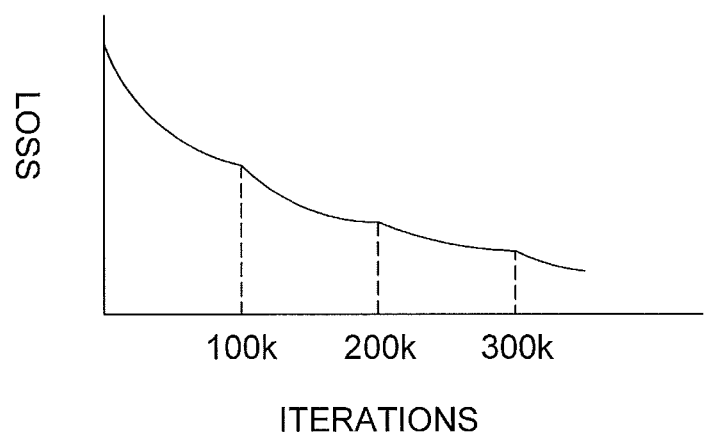
FIG. 1B is a drawing schematically illustrating a state in which a loss is changed when the neural network is learned by using the changed learning rate according to the conventional learning method.
Figure 4B:
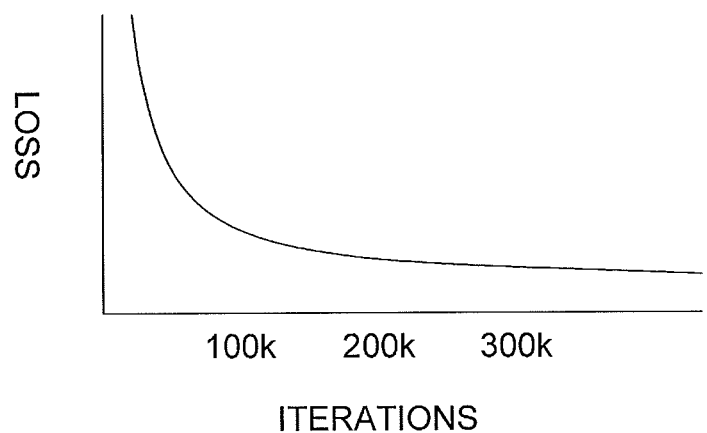
FIG. 4B is a drawing schematically illustrating a variation state of a loss in accordance with one example embodiment of the present invention.

In addition, as shown in FIG. 4B, since the learning rate is changed according to the loss, the loss is continuously reduced unlike the conventional method of FIG. 1B in which the loss is changed according to the change of the learning rate, and thus the optimal learning rate can be obtained by only one learning procedure.

Figure 5:
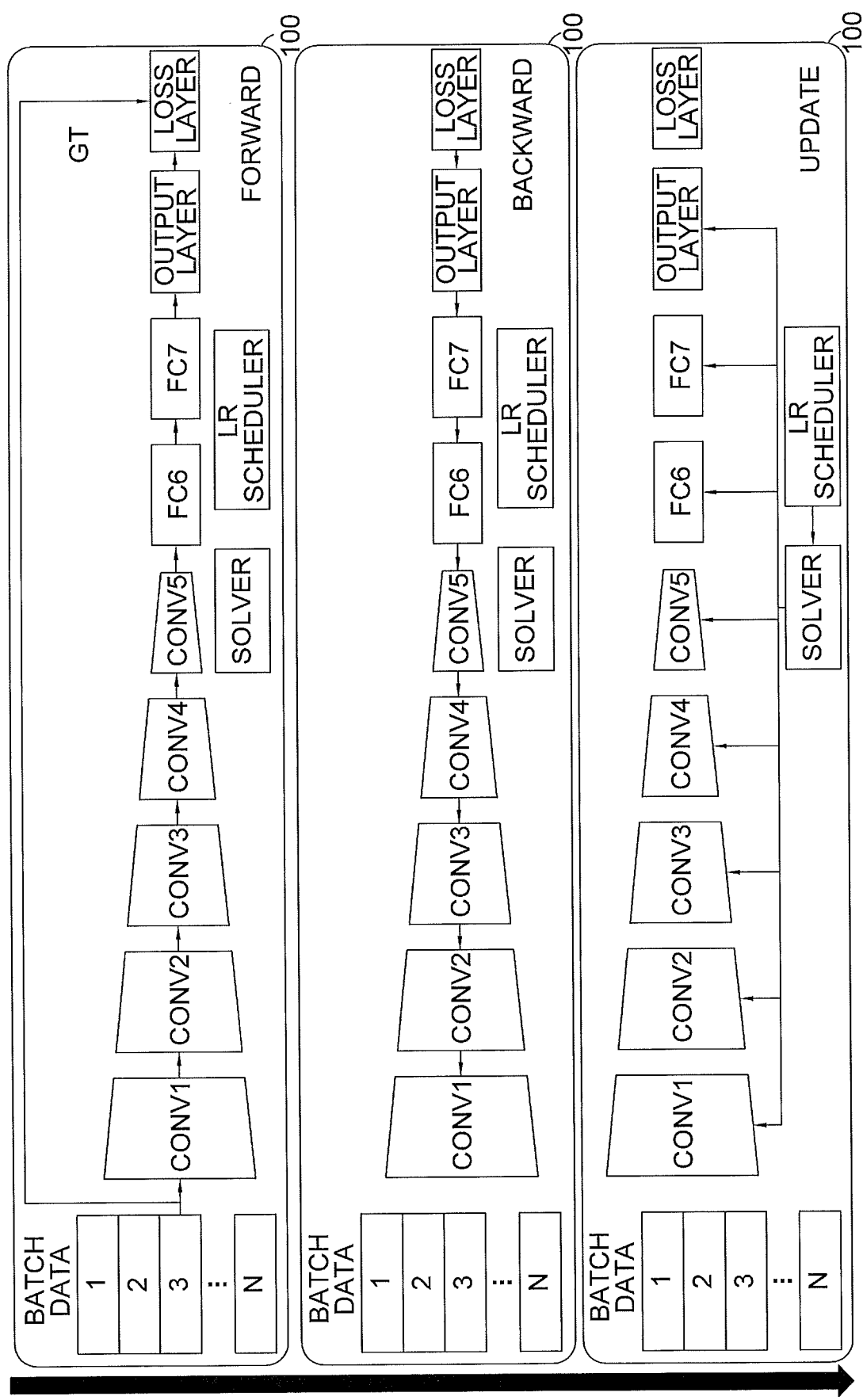
FIG. 5 is a drawing schematically illustrating a state of learning the neural network capable of detecting an object in accordance with one example embodiment of the present invention.

FIG. 5 is a drawing schematically illustrating a state of learning the neural network capable of detecting an object in accordance with one example embodiment of the present invention.

First of all, the learning device 100 instructs, by the forward process, (i) at least one convolution layer conv1, conv2, conv3, conv4, and conv5 to apply at least one convolution operation to the part of the training data to thereby output at least one feature map, (ii) at least one fully connected (FC) layer FC6 and FC7 to apply at least one FC operation to at least feature vector generated by pooling an area corresponding to a region of interest (ROI) on the feature map to thereby output probability values corresponding to at least one object included in the training data, and (iii) an output layer to output at least one class score and at least one regression delta corresponding to the probability values outputted from the FC layer.

Herein, the learning device 100 calculates each output of each layer by the forward process and finally calculates the loss value at the loss layer by referring to its corresponding ground truth (GT).

Thereafter, the learning device 100 delivers, by the backward process, the gradient of the output value for reducing the loss value in a backward direction from the backside layer by using each output value of each of the layers calculated in the forward process.

Herein, the learning device 100 instructs each of the layers to obtain the gradient of the weights through the output value gradient delivered from the backside layer.

Thereafter, the learning device 100 performs, by the update process, one iteration for learning by updating the weight values of each of the FC layers FC7 and FC6 and the convolution layers conv5, conv4, conv3, conv2, and conv1 by referring to the gradient of the weights of each of the layers which are obtained in the backward process.

Further, the learning device 100 may instruct an LR scheduler to change the current learning rate by referring to the loss values each time when the accumulated number of iterations reaches one of the first to n-th conditions and may deliver the changed learning rate to the solver to thereby instruct the solver to update the weight values of each of the layers by referring to the changed learning rate and the weight gradient of each of the layers. Herein, as described above, the solver may use stochastic gradient descent (SGD) scheme, Momentum scheme, Nesterov accelerated gradient (NAG) scheme, Adagrad (adaptive gradient) scheme, RMSProp scheme, AdaDelta (adaptive delta) scheme, Adam (adaptive moment estimation) scheme, etc.

Figure 6:
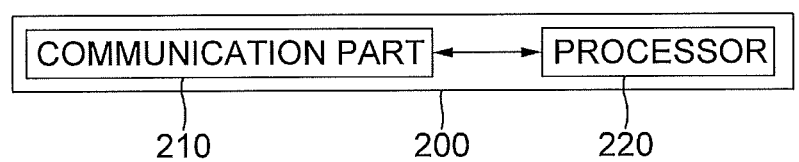
FIG. 6 is a drawing schematically illustrating a testing device capable of testing the neural network in accordance with one example embodiment of the present invention.

FIG. 6 is a drawing schematically illustrating a testing device 200 capable of testing the neural network in accordance with one example embodiment of the present invention, and the testing device 200 may include a communication part 210 and a processor 220.

The communication part 210 may obtain testing data, on condition that, assuming that a first gamma, which is a constant used for adjusting a change rate of the learning rate, has been predetermined, (a) a learning device, (i) has performed a first learning process of repeating the learning of the neural network at a predetermined first learning rate by using a part of training data while the accumulated number of iterations is equal to or less than the first specific value and (ii) has changed the first gamma to a second gamma by referring to first losses of the neural network which are obtained by the first learning process; and (b) the learning device, while increasing k from 2 to (n−1), (b1) has performed a k-th learning process of repeating the learning of the neural network at a k-th learning rate by using a part of the training data while the accumulated number of iterations is greater than a (k−1)-th specific value and is equal to or less than a k-th specific value, (b2) (i) has changed a k-th gamma to a (k+1)-th gamma by referring to k-th losses of the neural network which are obtained by the k-th learning process and (ii) has changed a k-th learning rate to a (k+1)-th learning rate by using the (k+1)-th gamma, and (b3) has performed a (k+1)-th learning process of repeating the learning of the neural network at the (k+1)-th learning rate by using a part of the training data while the accumulated number of iterations is greater than the k-th specific value and is equal to or less than a (k+1)-th specific value.

Further, if the testing data is fed into the neural network, the processor 220 instructs the neural network to output a result of operating the testing data by using parameters having been learned according to the first to (k+1)-th learning rates.

Herein, the neural network may include (i) at least one convolution layer capable of applying at least one convolution operation to the part of the training data to thereby output at least one feature map, (ii) at least one fully connected (FC) layer capable of applying at least one FC operation to at least feature vector generated by pooling an area corresponding to a region of interest (ROI) on the feature map to thereby output probability values corresponding to at least one object included in the training data, and (iii) an output layer capable of outputting at least one class score and at least one regression delta corresponding to the probability values outputted from the FC layer. Further, if the learning device 100 learns the FC layer and the convolution layer through backpropagation by using a loss calculated by referring to at least one output of the output layer and its corresponding ground truth (GT), the learning device 100 may determine a variation range of at least one parameter of the FC layer and the convolution layer by referring to the first learning rate to the k-th learning rate.

Hereinafter, the method for testing the neural network learned by the testing device 200 will be briefly described.

First of all, it is assumed that the neural network has been learned by the method described by referring to FIGS. 2 to 5.

Namely, on condition that a first gamma, which is a constant used for adjusting a change rate of the learning rate, has been predetermined, (a) a learning device, (i) has performed a first learning process of repeating the learning of the neural network at a predetermined first learning rate by using a part of training data while the accumulated number of iterations is equal to or less than the first specific value and (ii) has changed the first gamma to a second gamma by referring to first losses of the neural network which are obtained by the first learning process; and (b) the learning device, while increasing k from 2 to (n−1), (b1) has performed a k-th learning process of repeating the learning of the neural network at a k-th learning rate by using a part of the training data while the accumulated number of iterations is greater than a (k−1)-th specific value and is equal to or less than a k-th specific value, (b2) (i) has changed a k-th gamma to a (k+1)-th gamma by referring to k-th losses of the neural network which are obtained by the k-th learning process and (ii) has changed a k-th learning rate to a (k+1)-th learning rate by using the (k+1)-th gamma, and (b3) has performed a (k+1)-th learning process of repeating the learning of the neural network at the (k+1)-th learning rate by using a part of the training data while the accumulated number of iterations is greater than the k-th specific value and is equal to or less than a (k+1)-th specific value.

Likewise, on condition that the neural network has been learned, if testing data is obtained, the testing device 200 inputs the testing data to the neural network and instructs the neural network to output a result of applying the neural network operations to the testing data by using the parameters learned by the first learning rate to the (k+1)-th learning rate.

The present invention has an effect of minimizing the time required for learning the neural network by optimally adjusting the learning rate by reflecting the learning status.

The present invention has another effect of minimizing the time and the efforts required for finding the optimal result by learning the neural network because the learning rate can be optimally adjusted through one learning procedure in which the iterations are performed by adjusting the learning rate by referring to the losses.

The present invention has still another effect of finding out the optimal learning rate through one learning procedure by adjusting the gamma, to thereby minimize the time and the efforts required for the learning of the neural network.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning a neural network by adjusting a learning rate each time when an accumulated number of iterations reaches one of a first to an n-th specific values, comprising steps of:
   (a)(i) performing, by a learning device when a first gamma has been predetermined, a first learning process of repeating the learning of the neural network at a predetermined first learning rate by using a part of training data while the accumulated number of iterations is equal to or less than the first specific value, wherein the first gamma is a constant used for adjusting a change rate of the learning rate;
   (a)(ii) changing, by the learning device, the first gamma to a second gamma by referring to first losses of the neural network which are obtained by the first learning process;
   (a)(iii) increasing, by the learning device, a learning process index (k) from 1 to 2;
   (b1) performing, by the learning device, a k-th learning process of repeating the learning of the neural network at a k-th learning rate by using a part of the training data while the accumulated number of iterations is greater than a (k−1)-th specific value and is equal to or less than a k-th specific value, (b2)(i) changing, by the learning device, a k-th gamma to a (k+1)-th gamma by referring to a k-th loss gradient that is generated by referring to:
(i-1) k-th losses of the neural network which are obtained by the k-th learning process and
(i-2) (k−1)-th losses of the neural network which are obtained by a (k−1)-th learning process of repeating the learning of the neural network by using a part of the training data while the accumulated number of iterations is greater than a (k−2)-th specific value and is equal to or less than the (k−1)-th specific value and
(b2)(ii) changing, by the learning device, a k-th learning rate to a (k+1)-th learning rate by using the (k+1)-th gamma, and
(b3) performing, by the learning device, a (k+1)-th learning process of repeating the learning of the neural network at the (k+1)-th learning rate by using a part of the training data while the accumulated number of iterations is greater than the k-th specific value and is equal to or less than a (k+1)-th specific value; and
repeating steps (b1), (b2)(i), (b2)(ii), and (b3) while the learning device increases k from 2 to (n−1),
wherein, when the k-th loss gradient is equal to or greater than a predetermined minimum loss gradient, the learning device determines the (k+1)-th gamma by referring to a result generated by multiplying the k-th gamma by the k-th loss gradient, and
wherein the learning device determines the k-th loss gradient to be a ratio of a sum of the k-th losses to a sum of the (k−1)-th losses.

2. The method of claim 1, wherein, when the k-th loss gradient is less than the predetermined minimum loss gradient, the (k+1)-th gamma is determined as the k-th gamma.

3. The method of claim 1, wherein, at the step of (b2)(ii), the learning device determines the (k+1)-th learning rate to be a result that is generated by multiplying the k-th learning rate by the (k+1)-th gamma.

4. The method of claim 1, wherein each of the parts of the training data is batch data,
wherein the number of the batch data used while the accumulated number of iterations is equal to or less than the first specific value is determined as the number of iterations during the first learning process, and
wherein the number of the batch data used while the accumulated number of iterations is greater than the k-th specific value and is equal to or less than a (k+1)-th specific value is determined as the number of iterations during the (k+1)-th learning process.

5. The method of claim 4, wherein the number of the batch data used while the accumulated number of iterations is equal to or less than the first specific value is equal to the number of the batch data used while the accumulated number of iterations is greater than the k-th specific value and is equal to or less than a (k+1)-th specific value.

6. The method of claim 1,
wherein the neural network includes:
(i) at least one convolution layer capable of applying at least one convolution operation to the training data to thereby output at least one feature map,
(ii) at least one fully connected (FC) layer capable of applying at least one FC operation to at least one feature vector generated by pooling an area corresponding to a region of interest (ROI) on the feature map to thereby output probability values corresponding to at least one object included in the training data, and
(iii) an output layer capable of outputting at least one class score and at least one regression delta corresponding to the probability values outputted from the FC layer, and
wherein, when the learning device learns the FC layer and the convolution layer through backpropagation by using a loss calculated by referring to at least one output of the output layer and its corresponding ground truth (GT), the learning device determines a variation range of at least one parameter of the FC layer and the convolution layer by referring to the first learning rate to the k-th learning rate.

7. The method of claim 6,
wherein, on condition that:
(i) each of the parts of the training data is batch data,
(ii) the number of the batch data used while the accumulated number of iterations is equal to or less than the first specific value is determined as the number of iterations during the first learning process and
(iii) the number of the batch data used while the accumulated number of iterations is greater than the k-th specific value and is equal to or less than a (k+1)-th specific value is determined as the number of iterations during the (k+1)-th learning process,
the learning device learns the FC layer and the convolution layer through backpropagation by using a loss calculated by referring to each of at least one output of the output layer corresponding to each of the batch data and its corresponding GT.

8. A method for testing a neural network having been learned by adjusting a learning rate each time when an accumulated number of iterations reaches one of a first to an n-th specific values, comprising steps of:
(a) inputting, by a testing device, testing data to the neural network, the neural network having been learned by:
(I)(i) performing, by a learning device, when a first gamma has been predetermined, a first learning process of repeating the learning of the neural network at a predetermined first learning rate by using a part of training data while the accumulated number of iterations is equal to or less than the first specific value, wherein the first gamma is a constant used for adjusting a change rate of the learning rate, and
(I)(ii) changing, by the learning device, the first gamma to a second gamma by referring to first losses of the neural network, which are obtained by the first learning process; and
(I)(iii) increasing, by the learning device, a learning process index (k) from 1 to 2;
(II)(i) performing, by the learning device, a k-th learning process of repeating the learning of the neural network at a k-th learning rate by using a part of the training data while the accumulated number of iterations is greater than a (k−1)-th specific value and is equal to or less than a k-th specific value,
(II)(ii) changing, by the learning device, a k-th gamma to a (k+1)-th gamma by referring to a k-th loss gradient that is generated by referring to:
(ii-1) k-th losses of the neural network, which are obtained by the k-th learning process and
(ii-2) (k−1)-th losses of the neural network obtained by a (k−1)-th learning process of repeating the learning of the neural network by using a part of the training data while the accumulated number of iterations is greater than a (k−2)-th specific value and is equal to or less than the (k−1)-th specific value, and (II)(iii) changing, by the learning device, a k-th learning rate to a (k+1)-th learning rate by using the (k+1)-th gamma, and (II)(iv) performing, by the learning device, a (k+1)-th learning process of repeating the learning of the neural network at the (k+1)-th learning rate by using a part of the training data while the accumulated number of iterations is greater than the k-th specific value and is equal to or less than a (k+1)-th specific value; and (III) repeating steps (II)(i), (II)(ii), (II)(iii), and (II)(iv) while the learning device increases k from 2 to (n−1); and (b) instructing, by the testing device, the neural network to output a result of operating the testing data by using at least one parameter learned at the first learning rate to the (k+1)-th learning rate.

9. The method of claim 8, wherein the neural network includes:

(i) at least one convolution layer capable of applying at least one convolution operation to the training data to thereby output at least one feature map, (ii) at least one fully connected (FC) layer capable of applying at least one FC operation to at least one feature vector generated by pooling an area corresponding to a region of interest (ROI) on the feature map to thereby output probability values corresponding to at least one object included in the training data, and (iii) an output layer capable of outputting at least one class score and at least one regression delta corresponding to the probability values outputted from the FC layer, and wherein, upon learning the FC layer and the convolution layer through backpropagation by using a loss calculated by referring to at least one output of the output layer and its corresponding ground truth (GT), the learning device has determined a variation range of at least one parameter of the FC layer and the convolution layer by referring to the first learning rate to the k-th learning rate.

10. The method of claim 9,
wherein, on condition that:

(i) each of the parts of the training data is batch data,
(ii) the number of the batch data used while the accumulated number of iterations is equal to or less than the first specific value is determined as the number of iterations during the first learning process and
(iii) the number of the batch data used while the accumulated number of iterations is greater than the k-th specific value and is equal to or less than a (k+1)-th specific value is determined as the number of iterations during the (k+1)-th learning process, the learning device has learned the FC layer and the convolution layer through backpropagation by using a loss calculated by referring to each of at least one output of the output layer corresponding to each of the batch data and its corresponding GT.

11. A learning device for learning a neural network by adjusting a learning rate each time when an accumulated number of iterations reaches one of a first to an n-th specific values, comprising:

a processor for:

(a)(i) performing a first learning process of repeating the learning of the neural network at a predetermined first learning rate by using a part of acquired training data while the accumulated number of iterations is equal to or less than the first specific value, said performing performed when a first gamma has been predetermined, wherein the first gamma is a constant used for adjusting a change rate of the learning rate, and (a)(ii) changing the first gamma to a second gamma by referring to first losses of the neural network which are obtained by the first learning process, and (a)(iii) increasing a learning process index (k) from 1 to 2; and (b1) performing a k-th learning process of repeating the learning of the neural network at a k-th learning rate by using a part of the training data while the accumulated number of iterations is greater than a (k−1)-th specific value and is equal to or less than a k-th specific value, (b2)(i) changing a k-th gamma to a (k+1)-th gamma by referring to a k-th loss gradient that is generated by referring to:

(i-1) k-th losses of the neural network which are obtained by the k-th learning process and
(i-2) (k−1)-th losses of the neural network which are obtained by a (k−1)-th learning process of repeating the learning of the neural network by using a part of the training data while the accumulated number of iterations is greater than a (k−2)-th specific value and is equal to or less than the (k−1)-th specific value, and (b2)(ii) changing a k-th learning rate to a (k+1)-th learning rate by using the (k+1)-th gamma, and (b3) performing a (k+1)-th learning process of repeating the learning of the neural network at the (k+1)-th learning rate by using a part of the training data while the accumulated number of iterations is greater than the k-th specific value and is equal to or less than a (k+1)-th specific value; and repeating steps (b1), (b2)(i), (b2)(ii), and (b3) while increasing k from 2 to (n−1), wherein, when the k-th loss gradient is equal to or greater than a predetermined minimum loss gradient, the processor determines the (k+1)-th gamma by referring to a result generated by multiplying the k-th gamma by the k-th loss gradient, and wherein the processor determines the k-th loss gradient to be a ratio of a sum of the k-th losses to a sum of the (k−1)-th losses.

12. The learning device of claim 11, wherein, when the k-th loss gradient is less than the predetermined minimum loss gradient, the (k+1)-th gamma is determined as the k-th gamma.

13. The learning device of claim 11, wherein, at the step of (b2)(ii), the processor determines the (k+1)-th learning rate to be a result that is generated by multiplying the k-th learning rate by the (k+1)-th gamma.

14. The learning device of claim 11, wherein each of the parts of training data is batch data, wherein the number of the batch data used while the accumulated number of iterations is equal to or less than the first specific value is determined as the number of iterations during the first learning process, and wherein the number of the batch data used while the accumulated number of iterations is greater than the k-th specific value and is equal to or less than a (k+1)-th specific value is determined as the number of iterations during the (k+1)-th learning process.

15. The learning device of claim 14, wherein the number of the batch data used while the accumulated number of iterations is equal to or less than the first specific value is equal to the number of the batch data used while the accumulated number of iterations is greater than the k-th specific value and is equal to or less than a (k+1)-th specific value.

16. The learning device of claim 11, wherein the neural network includes:
(i) at least one convolution layer capable of applying at least one convolution operation to the parts of the training data to thereby output at least one feature map,
(ii) at least one fully connected (FC) layer capable of applying at least one FC operation to at least one feature vector generated by pooling an area corresponding to a region of interest (ROI) on the feature map to thereby output probability values corresponding to at least one object included in the training data, and
(iii) an output layer capable of outputting at least one class score and at least one regression delta corresponding to the probability values outputted from the FC layer, and
wherein, when the processor learns the FC layer and the convolution layer through backpropagation by using a loss calculated by referring to at least one output of the output layer and its corresponding ground truth (GT), the processor determines a variation range of at least one parameter of the FC layer and the convolution layer by referring to the first learning rate to the k-th learning rate.

17. The learning device of claim 16,
wherein, on condition that:
(i) each of the parts of the training data is batch data,
(ii) the number of the batch data used while the accumulated number of iterations is equal to or less than the first specific value is determined as the number of iterations during the first learning process and
(iii) the number of the batch data used while the accumulated number of iterations is greater than the k-th specific value and is equal to or less than a (k+1)-th specific value is determined as the number of iterations during the (k+1)-th learning process,
the processor learns the FC layer and the convolution layer through backpropagation by using a loss calculated by referring to each of at least one output of the output layer corresponding to each of the batch data and its corresponding GT.

18. A testing device for testing a neural network having been learned by adjusting a learning rate each time when an accumulated number of iterations reaches one of a first to an n-th specific values, comprising:
a processor configured to:
(a) input acquired testing data to the neural network, the neural network having been learned by a learning device:
(I)(i) performing, when a first gamma has been predetermined, a first learning process of repeating the learning of the neural network at a predetermined first learning rate by using a part of training data while the accumulated number of iterations is equal to or less than the first specific value, wherein the first gamma is a constant used for adjusting a change rate of the learning rate, and
(I)(ii) changing the first gamma to a second gamma by referring to first losses of the neural network, which are obtained by the first learning process; and (I)(iii) increasing a learning process index (k) from 1 to 2;
(II)(i) performing a k-th learning process of repeating the learning of the neural network at a k-th learning rate by using a part of the training data while the accumulated number of iterations is greater than a (k−1)-th specific value and is equal to or less than a k-th specific value,
(II)(ii) changing a k-th gamma to a (k+1)-th gamma by referring to a k-th loss gradient that is generated by referring to:
(ii-1) k-th losses of the neural network, which are obtained by the k-th learning process and
(ii-2) (k−1)-th losses of the neural network obtained by a (k−1)-th learning process of repeating the learning of the neural network by using a part of training data while the accumulated number of iterations is greater than a (k−2)-th specific value and is equal to or less than the (k−1)-th specific value, and
(II)(iii) changing a k-th learning rate to a (k+1)-th learning rate by using the (k+1)-th gamma, and
(II)(iv) performing a (k+1)-th learning process of repeating the learning of the neural network at the (k+1)-th learning rate by using a part of the training data while the accumulated number of iterations is greater than the k-th specific value and is equal to or less than a (k+1)-th specific value; and
(III) repeating steps (II)(i), (II)(ii), (II)(iii), and (II)(iv) while the learning device increases k from 2 to (n−1); and
(b) instruct the neural network to output a result of operating the testing data by using at least one parameter learned at the first learning rate to the (k+1)-th learning rate.

19. The testing device of claim 18, wherein the neural network includes:
(i) at least one convolution layer capable of applying at least one convolution operation to the training data to thereby output at least one feature map,
(ii) at least one fully connected (FC) layer capable of applying at least one FC operation to at least one feature vector generated by pooling an area corresponding to a region of interest (ROI) on the feature map to thereby output probability values corresponding to at least one object included in the training data, and
(iii) an output layer capable of outputting at least one class score and at least one regression delta corresponding to the probability values outputted from the FC layer, and
wherein, upon learning the FC layer and the convolution layer through backpropagation by using a loss calculated by referring to at least one output of the output layer and its corresponding ground truth (GT), the learning device has determined a variation range of at least one parameter of the FC layer and the convolution layer by referring to the first learning rate to the k-th learning rate.

20. The testing device of claim 19,
wherein, on condition that:
(i) each of the parts of training data is batch data,
(ii) the number of the batch data used while the accumulated number of iterations is equal to or less than the first specific value is determined as the number of iterations during the first learning process and (iii) the number of the batch data used while the accumulated number of iterations is greater than the k-th specific value and is equal to or less than a (k+1)-th specific value is determined as the number of iterations during the (k+1)-th learning process, the learning device has learned the FC layer and the convolution layer through backpropagation by using a loss calculated by referring to each of at least one output of the output layer corresponding to each of the batch data and its corresponding GT.

* * * * *